United States Patent [19]

Huber

[11] Patent Number: 5,388,915
[45] Date of Patent: Feb. 14, 1995

[54] BEARING BUSH

[75] Inventor: Thomas Huber, Iffeldorf, Germany

[73] Assignee: Bavaria Cargo Technologie GmbH, Munich, Germany

[21] Appl. No.: 57,547

[22] Filed: May 6, 1993

[30] Foreign Application Priority Data

May 13, 1992 [DE] Germany ............... 4215715

[51] Int. Cl.6 .................. F16C 35/02; F16C 33/20
[52] U.S. Cl. .................... 384/439; 384/295
[58] Field of Search .............. 384/37, 125, 129, 215, 384/220, 222, 276, 295, 296–300, 428, 439

[56] References Cited

U.S. PATENT DOCUMENTS

| 2,921,819 | 1/1960 | Rifkin | 384/439 |
| 3,215,026 | 11/1965 | Davis . | |
| 3,372,960 | 3/1968 | Fisher | 384/439 |
| 3,895,408 | 7/1975 | Leingang | 384/220 X |
| 4,582,435 | 4/1986 | Davis | 384/439 X |

FOREIGN PATENT DOCUMENTS

| 2186079 | 1/1974 | France . | |
| 2521660 | 8/1983 | France . | |
| 211589 | 4/1908 | Germany . | |
| 1523702 | 5/1941 | Germany . | |
| 1209396 | 1/1966 | Germany . | |
| 63595 | 9/1968 | Germany . | |
| 2108057 | 9/1971 | Germany . | |
| 2423361 | 12/1974 | Germany | 384/37 |
| 4103352 | 8/1991 | Germany . | |

OTHER PUBLICATIONS

K.-H. Sieker, "Fertingungs—und Stoffgerechtes Gestalten in der Feinwerktechnik" Springer Verlag, 1954 Seiten 123, 139.

*Primary Examiner*—Thomas R. Hannon

[57] ABSTRACT

A bearing bush for supporting the end of a shaft in a wall has a bush body with a through bore and a collar which projects radially at one end of the bush body and bears against the wall when the bearing bush is fitted into a bore in the wall. The length of the bush body is greater than the thickness of the wall. The inside surface of the bore of the bush body has a peripherally extending radial recess whose spacing from the collar is equal to the thickness of the wall. When the bush is installed in the bore in the wall the bush body can be compressed in the axial direction, undergoing plastic deformation, such that the bush body is upset to form on the side of the wall opposite the collar a radially projecting bulge portion which with the collar positively lockingly and immovably connects the bearing bush to the wall.

8 Claims, 1 Drawing Sheet

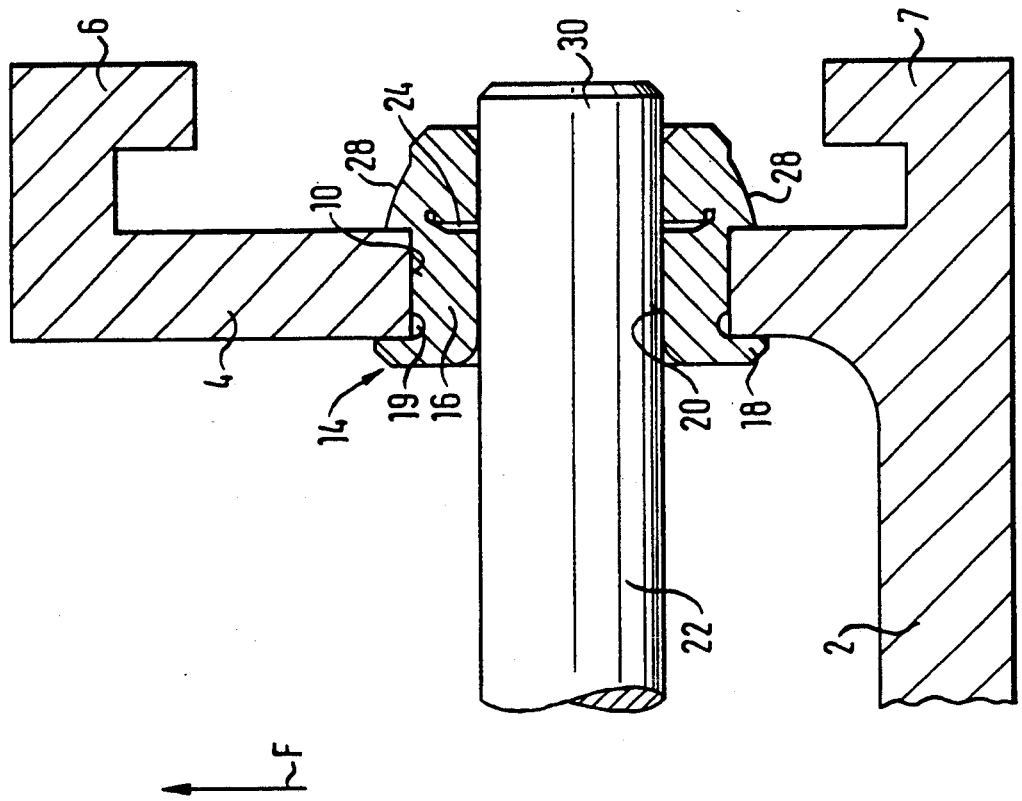
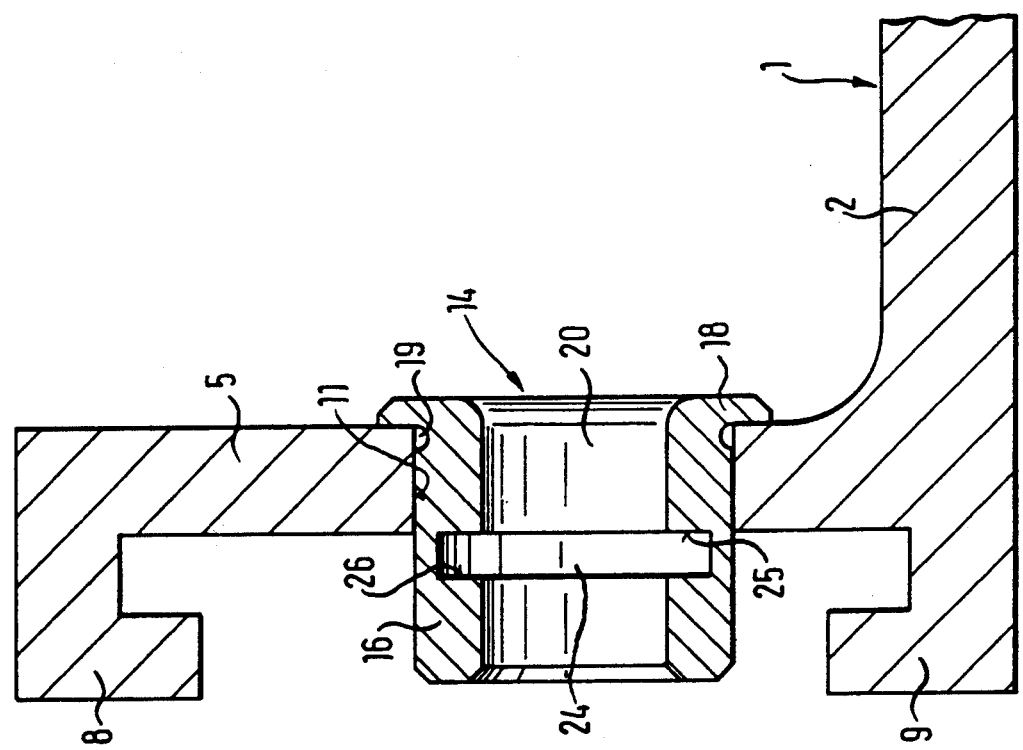

BEARING BUSH

BACKGROUND OF THE INVENTION

The present invention concerns a bearing bush for supporting an end of a shaft.

Various apparatuses such as more particularly anchoring arrangements for freight material in aircraft involve a requirement for a shaft to be mounted at its two ends in mutually oppositely disposed side walls such as the side wall portions of an upwardly open member, in a fashion which is as reasonably simple and inexpensive as possible. In the specific context of air freight, the above-mentioned upwardly open members form for example the base members of freight container anchors which have to be anchored by means of quick-operation securing devices in rails or bars which are let into the floor of the aircraft freight compartment.

The shaft may be mounted in the supporting walls either rotatably or non-rotatably. In the former case the shaft is rotatable relative to the walls of the member in which it is mounted while in the second case the stationary shaft rotatably supports a further element.

The crucial consideration is that such shafts and their bearings must be of such a configuration that, from the point of view of the member in which they are supported, they are capable of withstanding considerable forces, in particular in a radial direction. If for example such a shaft carries a locking bolt member which can be latched fast to secure a freight container to the floor of an aircraft freight compartment, the shaft together with its bearings must be capable of carrying forces which may be extremely high in the event of in-flight movements which differ from a horizontal flight path.

In this respect the member in which such shafts are supported should generally be as light as possible and it is therefore made for example from aluminium while its mutually oppositely disposed side walls or limbs have mutually aligned bores extending therethrough, through which the respective shaft extends in such a way that the ends thereof project only slightly or virtually not at all beyond the respective outside surface of the wall of the member. As the aluminium is too soft to support the shaft in the bores with the required level of strength, fitted into each bore is a bearing bush which consists of steel and which comprises a bush body which is of a substantially hollow-cylindrical configuration so that it has a bore extending therethrough. A radially projecting collar is disposed at one end of the bush body. The axial length of the bush body is approximately equal to the thickness of the wall of the member into which the bush is to be fitted. The inside diameter of the bore in the wall of the member in which the shaft is supported is equal to the outside diameter of the hollow-cylindrical bush body so that the bush is a press fit in the bore in the wall of the member in which the shaft is to be supported. In that arrangement the bush is pushed into the bore in the wall of the supporting member to such an extent that it bears with its projecting collar against one of the side surfaces of the wall of the member.

If now a shaft which is mounted at its two ends in that way is subjected to considerable forces in a radial direction, there is the tendency for the shaft to bend in the direction of such forces, in which case the longitudinal axes of the bearing bushes become tilted relative to the longitudinal axis of installation thereof, with deformation and enlargement of the bores in which they are accommodated. In addition the upper free ends of the limbs of the supporting member tend to move away from or towards each other, depending on the direction of the force acting radially on the shaft. Such deformation phenomena may be so severe that either the shaft together with the bearing bushes is pulled out of the bores in which the bushes are accommodated, or the shaft has its ends pulled out of the bearing bushes.

In order to prevent those undesired effects from occurring, it was hitherto normal practical for the thickness of the limbs of the supporting member to be as large as possible. In order not to cause an excessive increase in the weight of the supporting members as a result, openings or recesses were formed in the side walls of the supporting member wherever there were no mounting bores. In regard to manufacture, that meant that either the supporting members were extruded with a large wall thickness throughout and thereafter the openings which served to save weight had to be milled out, or alternatively the only option was to cast the supporting members as individual components. However both methods of manufacture are complex and give rise to high levels of cost.

SUMMARY OF THE INVENTION

An object of the present invention is to provide a bearing bush for supporting an end of a shaft in a wall of a member such as to permit the use of a supporting member of a thin wall gauge throughout while affording at least substantially the same load-carrying capacity, without involving the risk of deformation of both the mounting bores and the member, such as to result in the shaft ends slipping out of position.

Another object of the present invention is to provide a bearing bush for supporting an end of a shaft in a wall portion of a supporting member, which contributes to a secure supporting configuration for the shaft.

Still another object of the present invention is to provide a bearing bush for supporting a shaft end in a wall of a supporting member, such as to permit the supporting member to be of a more rational and economical design configuration.

In accordance with the principles of the present invention, the foregoing and other objects are attained by a bearing bush for supporting an end of a shaft in a wall such as a limb portion of a for example substantially U-shaped member, wherein the bearing bush comprises a bush body having an internal bore extending continuously therethrough, for receiving the shaft. At one end of the bush body the bush includes a collar which projects radially beyond the bush body and which in the installed condition in which the bearing bush is fitted with its bush body into a through bore in the above-mentioned wall, lies flush against one side surface of the wall. The axial length of the bush body is greater than the thickness of the wall in which the bush body is to be accommodated. Provided in the inside surface of the bore in the bush body is a peripherally extending radial recess whose spacing from the radially projecting collar is at least substantially equal to the axial thickness of the wall, that is to say the thickness as measured in the direction of the axis of the bore therethrough, so that after the bearing bush has been fitted into the wall, the bush body can be compressed in the axial direction with plastic deformation so that a radially projecting bulge portion is formed on the side of the wall opposite to the collar on the bearing bush, the bulge portion and the collar positively lockingly holding the bearing bush to the wall.

As will be seen in greater detail hereinafter with reference to a preferred embodiment of the bush according to the invention, the above-defined arrangement provides that the bearing bushes when positively connected to the walls of the supporting member can no longer tilt in the bores or openings in which they are accommodated, involving enlargement and deformation of such openings. In order for such a tilting movement to occur, the entire wall of the supporting member would have to be bent in a generally S-shape. However the forces required for that to occur are substantially higher than forces which are sufficient to deform and enlarge the bores in which the bearing bushes are supported. By virtue of being positively connected to the wall of the supporting member the bearing bush can no longer slip out of same. As substantially no tilting movement of the bearing bush relative to its correct position of installation is now possible, that also contributes to preventing the ends of the shaft from being pulled out of the bearing bushes in which they are mounted.

That therefore means that forces of the same magnitude can be carried by supporting member wall portions which are of a relatively small wall thickness throughout, that is to say, the supporting member does not have to be of a greater wall thickness in particular in the regions thereof in which bearing bushes are disposed, from the other parts of the supporting member. Because the supporting member is of a uniform wall thickness throughout, such a member can be extruded without openings or the like which serve for partially reducing the wall thickness having to be subsequently produced in the member by milling or other machining operations.

If the free ends of a shaft which is supported in such a supporting member by means of bearing bushes according to the invention are allowed to project somewhat outwardly beyond the bearing bushes when in the axially compressed condition, devices such as for example simple circlip rings can be fitted on the shaft here, to prevent axial displacement of the supported shaft relative to the bearing bushes and thus also relative to the side wall portions of the supporting member. A shaft which in that way is supported in a U-shaped supporting member that is open at one side acts as a tie member to prevent the side wall portions of the supporting member from being able to move away from each other in the above-described fashion.

Preferably, the bearing bushes are fitted into the side walls of the supporting member in such a way that their radially projecting collars are disposed on the inward sides of the side walls of the supporting member. Those collars which are of uniform thickness can then serve at the same time as contact surfaces and spacers for members which are mounted on the shaft and which move relative to the supporting member.

In accordance with another aspect of the invention, the foregoing and other objects are achieved by a method of installing a bearing bush according to the invention, wherein the bearing bush which is initially still in the undeformed condition is fitted into the bore for receiving sate in such a way that its radially projecting collar bears against a side face of the wall. Thereafter a mandrel is introduced into the internal bore in the bearing bush, the outside diameter of the mandrel being a snug fit to the internal diameter of the bore in the bearing bush. It is only after that mandrel has been introduced that the bearing bush is compressed in the axial direction thereof, with plastic deformation. After the bearing bush has been compressed in that way the mandrel is pulled out of the bore in the bearing bush to permit insertion of the shaft to be supported therein.

That mode of operation can ensure that the flow of material of the bearing bush in the axial compression thereof occurs only outwardly in a radial direction and results in the formation of the desired bulge configuration. The bore in the bearing bush which is required for the shaft to be subsequently inserted thereinto remains unaffected by the axial compression of the bearing bush. In addition the mandrel ensures that the part of the bearing bush which moves in the axial direction in the compression operation is not radially displaced or tilted.

In an alternative mode of operation the invention provides a method of installing a bearing bush according to the invention wherein the bearing bush is fitted into the bore in the wall in such a way that its radially projecting collar bears against the wall, the shaft to be supported is introduced into the bore in the bearing bush and, with the shaft inserted, the bearing bush is compressed in the axial direction with plastic deformation thereof. That procedure therefore provides that, instead of a separate mandrel which has to be withdrawn again after the bearing bush has been compressed, the bearing bush can be compressed in the axial direction when the shaft has already been inserted, if the geometrical circumstances so permit.

Further objects, advantages and features of the invention will be apparent from the following description of a preferred embodiment.

BRIEF DESCRIPTION OF THE DRAWING

The single FIGURE of the drawing is a view in cross-section through a U-shaped supporting member having side walls into which are fitted two bearing bushes according to the invention in mutually opposite relationship for supporting a continuous shaft, the bearing bush at the left-hand side in the FIGURE being partially installed while the bearing bush at the right-hand side of the FIGURE is in the fully installed position.

DESCRIPTION OF THE PREFERRED EMBODIMENT

Referring to the drawing, shown therein is a U-shaped supporting member 1 which has a horizontal continuous transverse web 2 which is downward in the drawing and the central portion of which is omitted from the drawing for the sake of simplicity thereof.

Adjoining each of the ends of the transverse web 2 is a respective limb 4, 5 which projects upwardly substantially at a right angle. Extending over the entire length of the member 1 at the upper and lower ends of each of the two limbs 4 and 5 are stiffening ribs 6, 7 and 8, 9 respectively which are of L-shaped cross-section and which are so disposed on the limbs 4 and 5 that they form therewith a C-shaped cross-sectional configuration which is open outwardly, that is to say in a direction away from the longitudinal central plane of the member 1.

The two walls or limbs 4, 5 of the member 1 have mutually oppositely disposed bores 10 and 11, of which two are shown in the FIGURE. Fitted into the bores 10 and 11 are bearing bushes 14 of which that shown at the left in the drawing is still in the form in which it was produced and inserted into the bore 11 while the bearing bush shown at the right in the drawing is already in the finally fitted position by having been compressed in the axial direction.

As can be seen from the drawing, each of the bearing bushes has a cylindrical bush body 16, the outside diameter of which is so selected that the bushes 14 can be fitted with a press fit into the bores 10 and 11 respectively. At one of its two ends, each of the cylindrical bush bodies 16 has a radially projecting collar 18 which, in the installed condition, bears with its face that is towards the bush body 16 against the inward side surface of the limb 4 or 5 of the member 1. In order to permit that flush contact without having to provide a chamfer at the bores 10, 11, the cylindrical outside surface of the bush body 16, in the transitional region between the collar 18 and the cylindrical outside surface of the bush body 16, has a relief configuration in the form of a groove 19 of small radial depth, which extends around the entire periphery of the bush body.

The axial length of the cylindrical bush body 16 in the non-compressed condition of the bearing bush 14 is approximately twice the wall thickness of the limbs 4 and 5 of the member 1.

Extending in the axial direction through the bush body 16 is a continuous bore 20 which is of round cross-section and which, to accommodate the shaft 22 to be supported, is of an inside diameter which is equal to the outside diameter of the shaft 22. The wall thickness of the cylindrical bush body 16 is somewhat less than half the inside diameter of the through bore 20. In order to facilitate insertion of the shaft 22, the bore 20 is enlarged in a slightly funnel-like configuration at its two axial ends.

Incorporated into the internal cylindrical surface of the bore 20 is a groove 24 which extends in the peripheral direction and which extends radially outwardly approximately over two-thirds of the wall thickness of the bush body. In the illustrated embodiment the groove 24 is of a substantially square cross-section. The spacing of the side wall 25 of the groove 24, which is closer to the collar 18, from the face of the collar 18 which is towards the bush body, is equal to the wall thickness of the limbs 4, 5 of the member 1.

After such a bearing bush 14 has been fitted into the associated bore 10 or 11 in the manner shown at the left in the FIGURE, a mandrel is inserted into its bore 20. Like the shaft 22 which is shown at the right in the FIGURE, the inserted mandrel completely fills the interior of the bearing bush. After that the bearing bush 14 is compressed in the axial direction, in which operation the inserted mandrel ensures that, when that plastic deformation takes place, material does not flow into the bore 20 and consequently reduce the internal width thereof. In addition the mandrel ensures that that pert of the bush body 16 which in the axial compression operation is displaced towards the respective limb 4 or 5 of the member 1 actually moves only in the axial direction without involving radial displacement or tilting which would also make it difficult subsequently to insert the shaft 22 or in the worst case even prevent that insertion.

Axial compression of the bearing bushes 14 is effected to such an extent that the mutually oppositely disposed side walls 25, 26 of the groove 24 come to bear against each other, that is to say, even to a somewhat greater extent than is shown on the right-hand side in the drawing where the groove 24 is shown as still being of a somewhat larger residual width, for the sake of clarity.

Owing to the plastic deformation which is produced by compression in the axial direction, an edge bead as indicated at 28 is formed by bulging on the side of the respective limb 4 or 5 which is opposite to the collar 18. The bead 28 extends over the entire periphery of the bearing bush 16. The bead 28 has a face which is towards the adjacent outward surface of the limb 4 and which extends radially almost at a right angle to the outside surface of the bush body 16, and that face of the bead 28 lies flush against the outside surface of the limb 4 so that a fixed, positive connection is thus formed between the bearing bush 14 and the respective limb 4 or 5; that connection reliably prevents the bearing bush from being pulled out of the associated bore 10 or 11 in one axial direction or the other. As shown on the right-hand side in the drawing, the associated end 30 of the shaft 22 projects slightly outwardly beyond the bearing bush 14 in the compressed condition. It will be appreciated that a similar consideration also applies in regard to the opposite end (not shown) of the shaft 22 when the bearing bush 14 at that end has been compressed in the axial direction in a corresponding manner.

A respective circlip or locking ring can then be fitted on to each of the slightly projecting ends 30 of the shaft 22 to prevent the ends 30 of the shaft 22 from being pulled out of the associated bearing bushes, even when extremely high forces act on the shaft 22 in the direction indicated by the arrow F.

It will be noted rather that this arrangement incorporates into the upwardly open member 1 a transverse stiffening configuration which prevents the limbs 4, 5 of the member 1 from moving away from each other when the above-discussed forces act thereon which would make it easier for the shaft 22 to bend and for the shaft ends 30 to slip out of the bearing bushes 16. Displacement of the bearing bushes 14 relative to the respective limbs 4, 5 is prevented in any case by virtue of the positive connection created by means of the collar 18 and the edge bead 28. This arrangement also reliably prevents tilting of the longitudinal axes of the bearing bushes 14 relative to the direction of installation thereof, which occurs when the bores 10 and 11 deform.

A corresponding consideration also applies in regard to forces which act in the opposite direction to the direction indicatd by the arrow F and which, without the features according to the invention, could cause the side wall portions 4, 5 of the member 1 to bend inwardly.

By virtue of the high level of rigidity of the assembled arrangement, which can be achieved due to the above-described configuration of the bearing bushes, while affording the same load-bearing capability, the wall thickness or gauge of the limbs 4, 5 of the member 1 can be substantially less than was hitherto the case. That also makes it possible for the limbs 4, 5 to be of a uniform thickness over their entire length, with at the same time a reduction in weight. As a consequence the entire member 1 can be produced in finished form by an extrusion process, which gives a considerable reduction in costs.

The above-described advantages can be achieved irrespective of whether the shaft 22 is rotatably or non-rotatably mounted in the bearing bushes 14.

In the embodiment described the shaft 22, the bores 20 in the bushes 14 and the mounting bores 10, 11 in the limbs 4, 5 of the member 1 are each of round cross-section. However the principle according to the invention is independent of that cross-sectional shape and it can also be used in relation to square or other cross-sectional configurations. A similar point also applies if the two walls in which the shaft ends are to be supported are not components of one and the same supporting member and/or do not extend parallel to each other.

It will be appreciated that the above-described embodiment has been set forth solely by way of example and illustration of the principles of the present invention and that further modifications may be made therein without thereby departing from the spirit and scope of the invention.

What is claimed is:

1. A bearing bush for supporting an end of a shaft in a wall, the bearing bush comprising a plastically deformable bush body having first and second ends and a bore therethrough for accommodating the shaft, and a collar which projects radially beyond the bush body at one end thereof and which, in an installed condition in which the bearing bush is fitted with its bush body into a through bore in said wall lies at least substantially flush against a side face of said wall, the bush body having an axial length that is greater than a thickness of the wall for accommodating the bearing bush, and an inside surface of the bore in the bush body having a peripherally extending radial recess which is spaced from said collar by a distance that is at least approximately equal to the thickness of the wall, so that, after the bearing bush has been fitted into the wall, the bush body can be short-term compressed in the axial direction, to produce a permanent plastic deformation, whereby formed on a side of the wall which is in opposite relationship to the collar of the bearing bush is a radially projecting permanent portion which together with the collar positively lockingly mounts the bearing bush to the wall.

2. A bearing bush as set forth in claim 1 wherein said bore of the bush body is of circular cross-section perpendicularly to its longitudinal axis.

3. A bearing bush as set forth in claim 1 wherein said bore of the bush body is of a square cross-section perpendicularly to its longitudinal axis.

4. A bearing bush as set forth in claim 1 wherein the outside of the bush body is in the shape of a cylinder which is circular in cross-section perpendicularly to its longitudinal axis.

5. A bearing bush as set forth in claim 1 wherein the outside of the bush body is in the form of a prism which is square in cross-section perpendicularly to its longitudinal axis.

6. A bearing bush as set forth in claim 1 wherein said recess is in the form of a groove of a substantially square cross-section.

7. A bearing bush as set forth in claim 1 including in the transitional region between the outside surface of the bush body and said collar a relief portion in the form of a radially inwardly extending groove which extends over the entire outside periphery of the bush body.

8. A bearing bush as set forth in claim 1 wherein said shaft end supported in the bearing bush projects out of the bearing bush in the axial direction to such an extent that a means can be mounted thereon, to restrict axial displacement of said shaft end towards the bearing bush.

* * * * *